(12) United States Patent
Cull et al.

(10) Patent No.: US 7,285,903 B2
(45) Date of Patent: Oct. 23, 2007

(54) DISPLAY WITH BRIGHT BACKLIGHT

(75) Inventors: Brian D. Cull, Glendale, AZ (US);
Allan E. Harris, Phoenix, AZ (US);
Elias S. Haim, Glendale, AZ (US);
Brent D. Larson, Cave Creek, AZ (US)

(73) Assignee: Honeywell International, Inc., Morristown, NJ (US)

( * ) Notice: Subject to any disclaimer, the term of this patent is extended or adjusted under 35 U.S.C. 154(b) by 107 days.

(21) Appl. No.: 10/893,019

(22) Filed: Jul. 15, 2004

(65) Prior Publication Data
US 2006/0012286 A1   Jan. 19, 2006

(51) Int. Cl.
*H01J 1/62* (2006.01)
*F21V 7/00* (2006.01)

(52) U.S. Cl. .................. 313/500; 313/505; 362/227; 362/800

(58) Field of Classification Search ........... 313/500, 313/505; 362/800
See application file for complete search history.

(56) References Cited

U.S. PATENT DOCUMENTS

| | | | | |
|---|---|---|---|---|
| 6,250,774 B1 * | 6/2001 | Begemann et al. | ......... | 362/800 |
| 6,692,137 B2 * | 2/2004 | Blanchard | .................... | 362/241 |
| 2002/0001193 A1 * | 1/2002 | Osawa et al. | ............... | 362/800 |
| 2004/0207315 A1 * | 10/2004 | Robbie et al. | .............. | 313/504 |

FOREIGN PATENT DOCUMENTS

| | | |
|---|---|---|
| EP | 1371901 A2 | 12/2003 |
| JP | 2002 184209 | 6/2002 |
| JP | 2002184209 A * | 6/2002 |
| JP | 2003 347595 | 12/2003 |
| JP | 2004 014367 | 1/2004 |
| JP | 2005 150036 | 6/2005 |

OTHER PUBLICATIONS

PCT International Search Report PCT/US2005/025073, Feb. 8, 2006.

* cited by examiner

*Primary Examiner*—Sikha Roy
*Assistant Examiner*—Natalie K. Walford
(74) *Attorney, Agent, or Firm*—Ingrassia Fisher & Lorenz

(57) ABSTRACT

Methods and apparatus are provided for projecting light carrying a data image. The apparatus comprises a first layer having regions of electrically alterable variable light transmittance adapted to form the data image, and a hollow cavity backlight having a light exiting surface coupled to the first layer and adapted to provide light to the first layer through the light exiting surface from one or more light emitters some of which point in a principal direction other than at right angles to the light exiting surface. In a preferred embodiment, LEDs are used as the light emitters and are preferably mounted on one or more printed circuit boards or other support tilted at non-zero angles with respect to the light exiting surface.

24 Claims, 8 Drawing Sheets

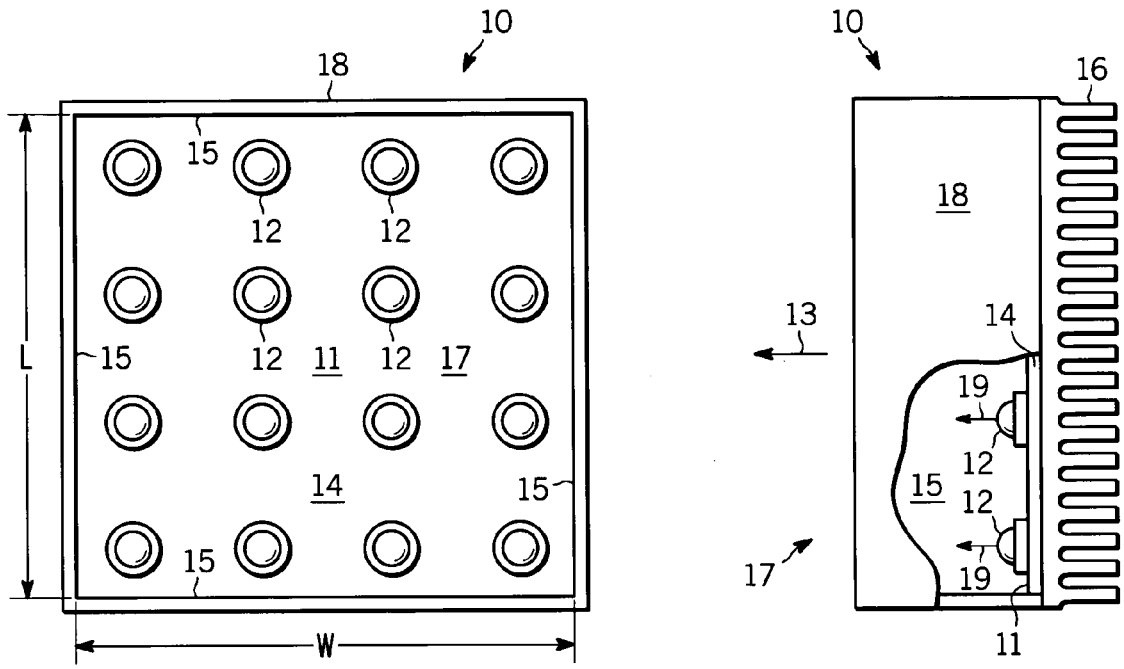
FIG. 1A
(PRIOR ART)
FIG. 1B
(PRIOR ART)
FIG. 2
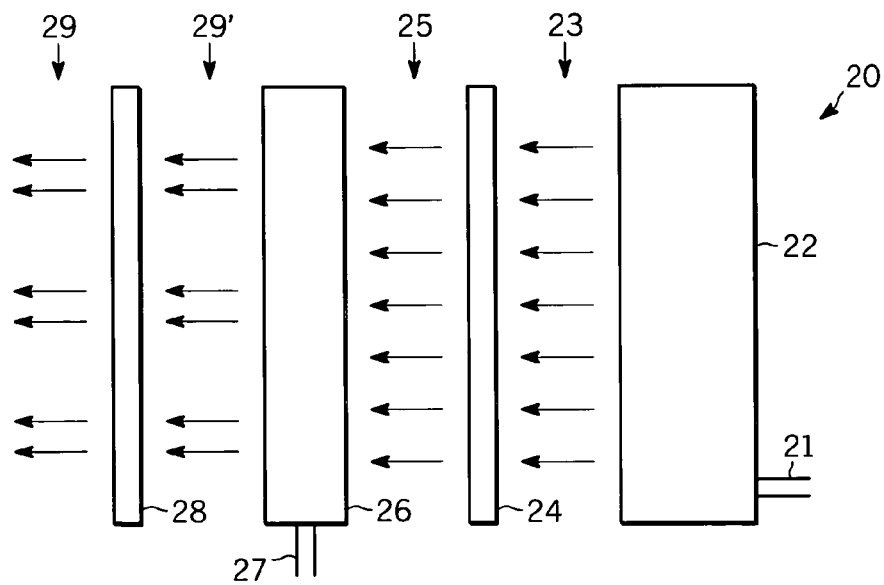

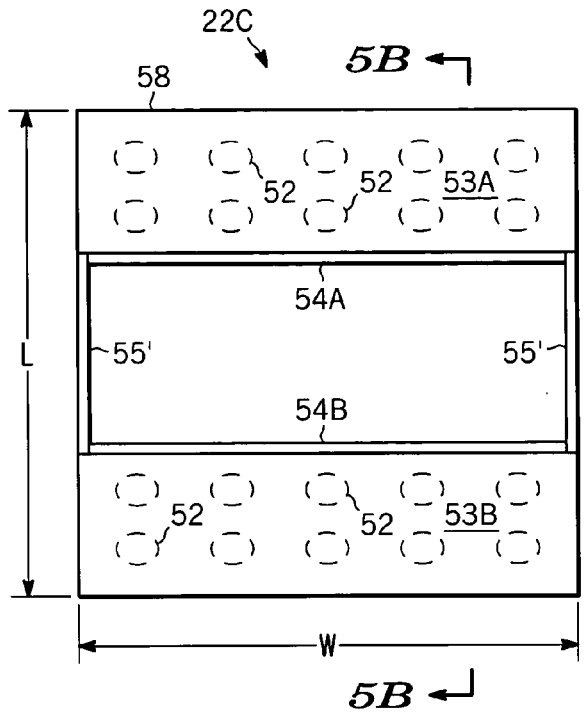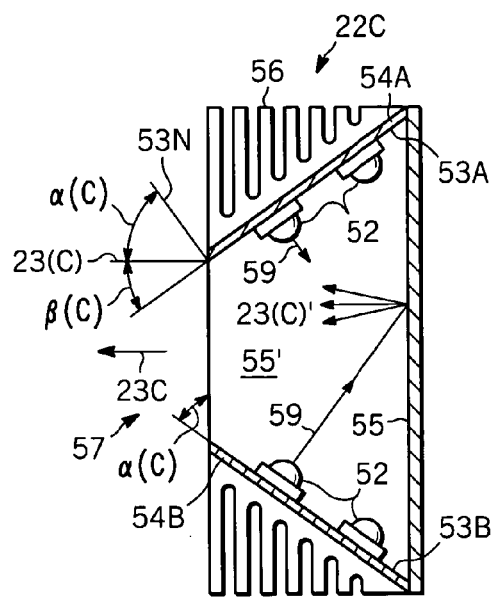
FIG. 5A  FIG. 5B
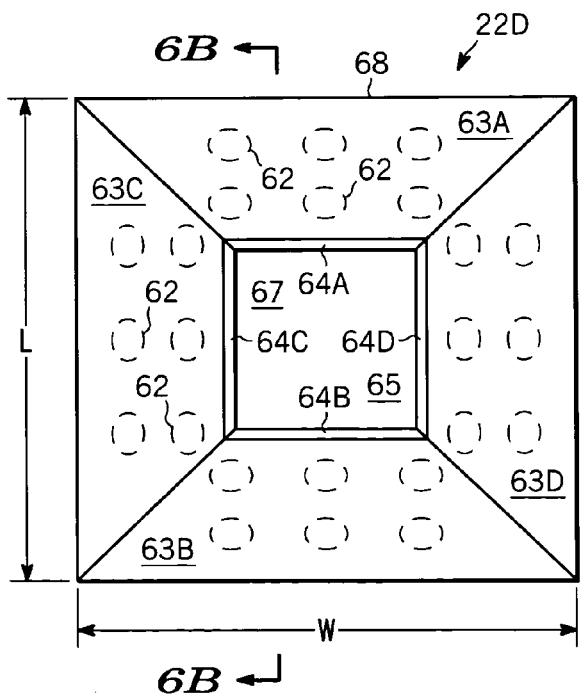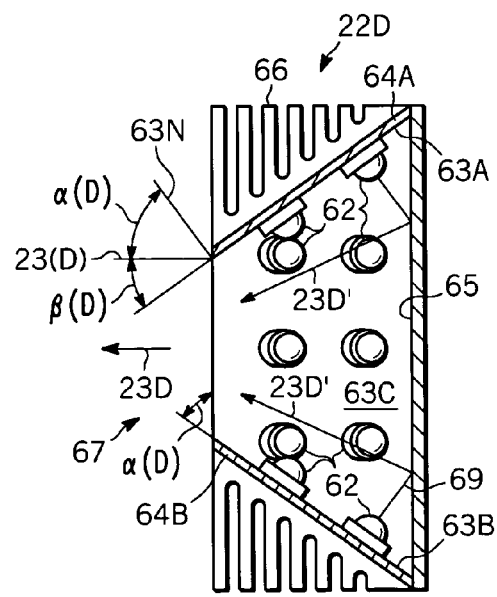
FIG. 6A  FIG. 6B

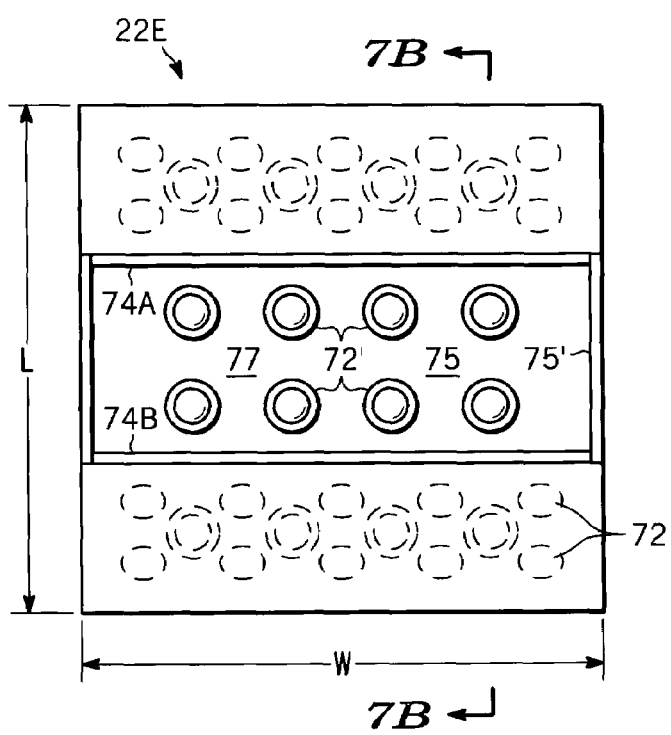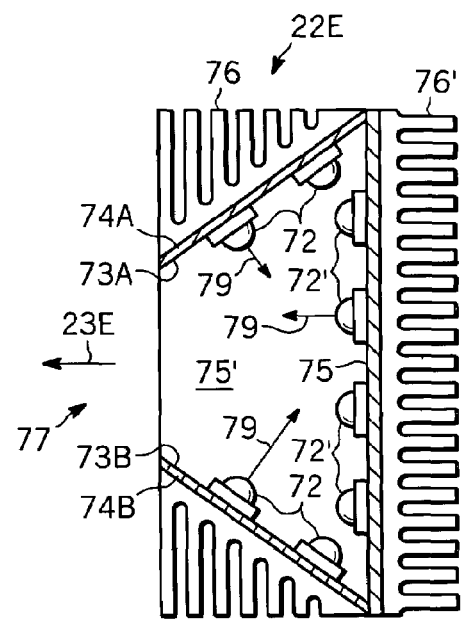
FIG. 7A
FIG. 7B

DISPLAY WITH BRIGHT BACKLIGHT

TECHNICAL FIELD

The present invention generally relates to electronic displays, and more particularly to flat panel transmissive displays employing backlights and backlights therefore.

BACKGROUND

Modern display applications often use a backlight in combination with, for example, a transmissive liquid crystal display (LCD) layer to provide a variety of alphanumeric and/or graphical information to a viewer. For convenience of explanation such alphanumeric and/or graphical information is hereafter collectively referred to as "data" and the word "data" is intended to include all types of visually perceivable information. The most common types of backlights are fluorescent lamp backlights. While they are effective they suffer from a number of disadvantages, among which are the need for comparatively high driving voltage and the complexity or difficulty of providing dimming (variable luminescence) and user alterable color (variable chrominance). Also, in applications such as avionics systems where mechanical ruggedness is desired, the comparative fragility of fluorescent backlights can be a drawback.

It is known to use light emitting diodes (LEDs) in backlights. FIG. 1A shows a plan view and FIG. 1B shows partially cut-away side view of LED backlight 10 according to the prior art. Backlight 10 has multiple LEDs 12 mounted on printed circuit board (PCB) 14 or equivalent, with the PCB generally oriented perpendicular to backlight propagation direction 13. LEDs 12 are oriented so that principal light rays 19 emitted therefrom are coincident with, or parallel to, light 13 emitted from open surface 17 of backlight 10. Light 13 is the sum of light rays 19 emitted by individual LEDs 12. Heat sink 16 is generally provided behind PCB 14 to aid in extraction of heat generated by LEDs 12. LEDs 12 and PCB 14 are generally enclosed in box or frame 18 whose interior surfaces 11, 15 are desirably reflective and with surface 17 open. Additional optical elements such as diffusers are often placed adjacent open surface 17.

While prior art backlights such as are shown in FIGS. 1A-B are useful they often do not provide as much brightness (luminance) as is desired. This is especially troublesome in connection with head-up displays (HUDs) where the highest possible luminance is often needed. In a HUD, the data generated by the display is projected onto an angled transparent screen through which the background scene is being simultaneously viewed. The data is reflected from the angled screen toward the viewer while the background scene is transmitted through the same screen to the viewer. When the background scene is bright, the data may not be visible unless the data display is also very bright. For transmissive displays such as LCDs, the display luminance depends on the backlight luminance. Hence, there is an ongoing need for high luminance displays with high luminance backlights.

Accordingly, it is desirable to provide an improved backlight, backlit display and method, especially apparatus and methods with high luminance. In addition, it is desirable that the backlight and backlit display be simple, rugged and reliable. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for projecting light carrying a data image. The apparatus comprises a first layer having regions of electrically alterable variable light transmittance adapted to form the data image, and a backlight having a light exiting surface coupled to the first layer and adapted to provide light to the first layer through the light exiting surface from one or more light emitters some of which point in a principal direction other than at right angles to the light exiting surface. In a preferred embodiment, LEDs are used as the light emitters and are mounted on one or more printed circuit boards (PCBs) or other support tilted at various non-zero angles with respect to the light exiting surface and the first layer.

BRIEF DESCRIPTION OF THE DRAWINGS

The present invention will hereinafter be described in conjunction with the following drawing figures, wherein like numerals denote like elements, and FIG. 1A is a plan view and FIG. 1B is a partially cut-away side view of an LED backlight according to the prior art;

FIG. 2 is a simplified exploded view of a typical backlit display according to the present invention;

FIG. 5A is a plan view and FIG. 5B is a partial cross-sectional side view of an LED backlight according to a still further embodiment of the present invention;

FIG. 6A is a plan view and FIG. 6B is a partial cross-sectional side view of an LED backlight according to a yet further embodiment of the present invention;

FIG. 7A is a plan view and FIG. 7B is a partial cross-sectional side view of an LED backlight according to yet another embodiment of the present invention;

DETAILED DESCRIPTION

Figure 3A:
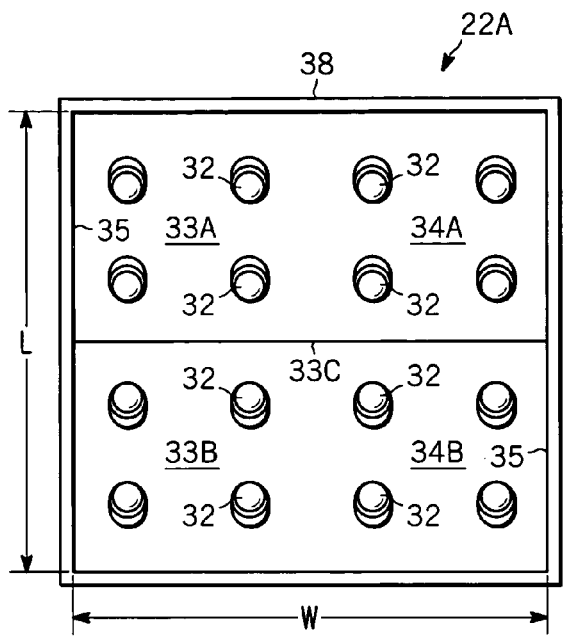
FIG. 3A is a plan view and FIG. 3B is a partially cut-away side view of an LED backlight according to a first embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. For convenience of explanation, the LEDs used in the present invention are described as being mounted on a printed circuit board but this is not intended to be limiting and any convenient substrate may be used. Accordingly, the term "printed circuit board" and the abbreviation "PCB" are intended to include such alternative support means.

FIG. 2 is a simplified exploded view of backlit display 20, according to an exemplary embodiment of the present invention. Display 20 comprises backlight 22 fed by electrical leads 21, and optional diffuser 24 that assists in homogenizing light 23 emitted from backlight 22. Light 25 exiting diffuser 24 enters LCD layer or other electrically alterable transmission layer 26 where it is patterned according to the electrical signals provided to layer 26 via leads 27. Thin film transistors (TFTs) are conventionally incorporated in layer 26 where layer 26 employs active liquid crystal switching. For the purposes of the present invention, layer 26 may be any type of layer having optical transmission characteristics that may be electrically altered in different regions of the layer so as to create an optical image of the desired data. Where optical signal 29 (e.g., data) emitted by display 20 is to have color variation, then optional color filter layer 28 is preferably provided to receive output 29' from image forming layer 26. Display 20 can be monochromatic or colored according to the needs of the particular application.

In the preferred embodiment, light 23 emitted from backlight 22 is directed approximately normal to the surface of alterable transmission layer 26, and includes light output distributed about the normal direction. Various arrangements 22A, 22B, 22C, 22D, 22E, 22F, 22G, 22H, 22J for implementing backlight 22 are shown in FIGS. 3A-B, 4A-B, 5A-B, 6A-B, 7A-B, 8A-B, 9A-B, 10, 11 respectively and will now be discused. In FIGS. 1A-B, 3A-B, 4A-B, 5A-B, 6A-B, 7A-B, 8A-B, 9A-B the numbers of LEDs shown in each figure are merely for purposes of illustration and not intended to provide a quantitative comparison of the LED packing density that may be achieved with the different geometrical arrangements shown in these figures.

Figure 3B:
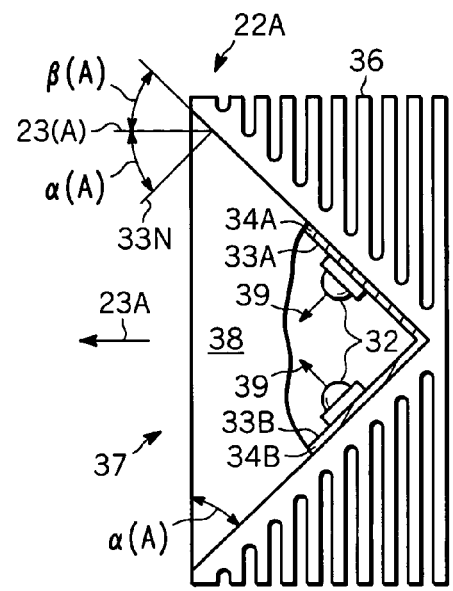

FIGS. 3A is a plan view and FIG. 3B is a partially cut-away side view of LED backlight 22A according to a first exemplary embodiment of the present invention. Backlight 22A is a hollow cavity backlight defined by a number of surfaces. As a hollow cavity backlight, the enclosed volume is filled with a medium having a refractive index of approximately 1.0, such as air. Backlight 22A comprises LEDs 32 mounted on sloped surfaces 33A, 33B of PCBs 34A, 34B (or equivalent), respectively. PCB surfaces 33A, 33B on which LEDs 32 are mounted are considered as light emitting surfaces and face opening 37, making an oblique (neither parallel nor perpendicular) angle α(A) with respect to the plane of opening 37 (the light exiting surface) of backlight 22A. PCB surfaces 33A, 33B likewise make angle β(A)=(90−α(A)) degrees with respect to backlight propagation direction 23A. PCB surfaces 33A, 33B are inclined with respect to each other, meaning that they are not parallel. In general, principal light emission direction 39 from LEDs 32 is parallel to normal 33N to PCB surfaces 33A, 33B on which LEDs 32 are mounted. Normal 33N to either PCB surfaces 33A, 33B defines the direction each respective surface is facing, and makes an angle of magnitude α(A) with respect to backlight propagation direction 23A. Stated alternatively, principal light ray 39 of LEDs 32, which is approximately normal to PCB surfaces 33A, 33B, makes an angle α(A) with respect to backlight propagation direction 23A. Angle α(A) is usefully in the range 15 to 65 degrees, conveniently in the range of about 25 to 50 degrees, more conveniently in the range of about 35 to 45 degrees, and preferably about 40 degrees. Accordingly, β(A) is usefully in the range 25 to 75 degrees, conveniently in the range of about 40 to 65 degrees, more conveniently in the range of about 45 to 55 degrees, and preferably about 50 degrees. While α(A)~40 degrees is preferred, this is not critical.

The hollow cavity containing LEDs 32 is preferably fully enclosed with the exception of opening 37. Interior surfaces 33A, 33B and 35 of case or frame 38 are desirably reflective so as to redirect light impinging thereon from LEDs 32 generally in direction 23A toward opening 37 of backlight 30. Surfaces 33A, 33B and 35 may be specularly reflective, diffusely reflective or have surface variations so as to scatter as well as reflect the impinging light. What is preferable is that such interior surfaces have low optical absorption since a portion of light 23A emitted through opening or surface 37 will undergo at least one reflection. Efficiency is further enhanced in this embodiment by having each emitting surface, in this case PCB surface 33A or 33B on which LEDs 32 are mounted, face the light exiting surface or opening 37, meaning that the surface normal to the nominal center of the emitting surface generally points in the direction of the light exiting surface without predominant intervening light blocking structure. This enhances the coupling of the emitting surface to light exiting surface 37.

In general, the number of LEDs that can be incorporated in a backlight is limited by the available PCB area and dissipation capabilities of associated heat sink 36. Other things being equal, providing a larger available PCB area allows the light generation to be spread out and thereby allows for improved thermal management. This is beneficial in multiple ways. The increased area gives better access for cooling heat sinks, for example on the rear side of the emitting area. In addition, many light sources including LEDs exhibit an efficiency that is temperature dependent. With LEDs, for example, the efficiency can degrade as the semiconductor junction temperature goes up. The larger the available PCB area, the more LEDs that can be accommodated, allowing the necessary power to be distributed over more devices. While the larger surface area and increased number of LEDs can slightly reduce the optical efficiency of the cavity, this is offset by the improved thermal environment of the LED junctions when using the configuration of FIGS. 3A-B, resulting in greater luminance capability from the backlight. It will be noted that, for the same backlight footprint (W×L), the backlight structures of the present invention provides greater PCB area and, therefore, can accommodate a larger number of LEDs. For example, where α(A)=45 degrees and for the same overall footprint (W×L), backlight structure 22A of FIGS. 3A-3B provides a PCB area that is approximately $(2)^{1/2}$ times the PCB area of prior art unit 10 of FIGS. 1A-1B. This increase in available PCB area for mounting LEDs without an increase in the overall backlight footprint is a particular feature of the present invention. This preferred embodiment thereby allows the use of emitting surface 33A, 33B larger than the light exiting surface 37, and with each emitting surface 33A, 33B facing the light exiting surface without intervening structures.

Figure 4A:
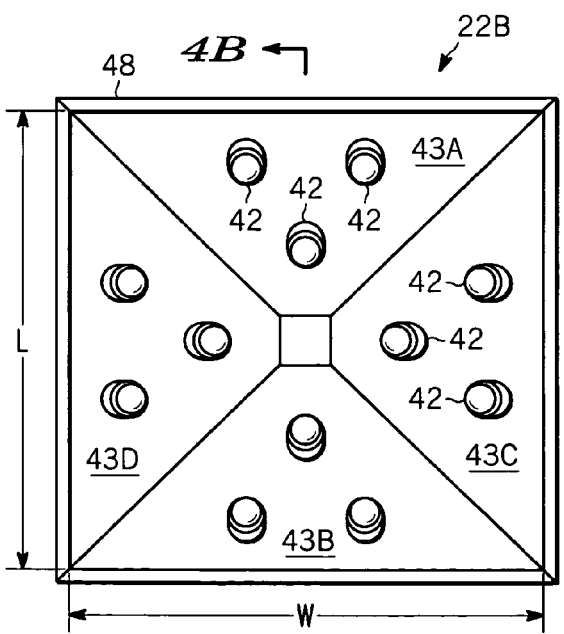
FIG. 4A is a plan view and FIG. 4B is a partial cross-sectional side view of an LED backlight according to another embodiment of the present invention.
Figure 4B:
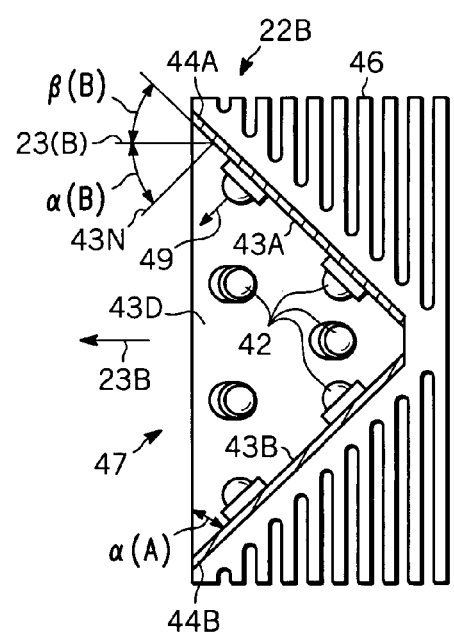

FIG. 4A is a plan view and FIG. 4B is a partial cross-sectional side view of LED backlight 22B according to another embodiment of the present invention. Backlight 22B includes LEDs 42 and heat sink 46 analogous to LEDs 32 and heat sink 36 of FIGS. 3A-B. Backlight 22B of FIGS. 4A-B differs from backlight 22A of FIGS. 3A-B in the number of sloped surfaces. Backlight 22A of FIGS. 3A-B has two sloped surfaces 33A, 33B forming a V-shaped structure with the open portion of the "V" oriented toward opening 37 and backlight propagation direction 23A. Backlight 22B of FIGS. 4A-4B has four sloped surfaces 43A, 43B, 43C, 43D forming a pyramidal structure whose open base is aimed toward opening or surface 47 and backlight propagation direction 23B, analogous to direction 23A. LEDs 42 are mounted on surfaces 43A-D. Surfaces 43A-D of backlight 22B conveniently make angles α(B), β(B) with respect to opening 47 and principal light rays 49, analogous to angles α(A), β(A) with respect to opening 47 and principal light rays 49 of backlight 22B. For the same overall backlight footprint (W×L) and light exiting surface area, the pyramidal structure of backlight 22B provides larger PCB area as compared to the arrangement of FIGS. 1A-B, and other things being equal, can accommodate more LEDs and provide correspondingly greater luminance in the same overall footprint. As before, this is in large part due to the relaxation of thermal constraints on the LED junctions, as described above, allowing either higher efficiency at an equivalent power level or higher total power at an equivalent LED efficiency level. (The numbers of LEDs shown in FIGS. 1-9 are merely for convenience of explanation and not intended to provide a quantitative comparison of the achievable LED packing density for the various backlight structures.) Angle α(B) is usefully in the range 15 to 65 degrees, more conveniently in the range of about 25 to 50 degrees and preferable about 40 degrees. Accordingly, β(B) is usefully in the range 25 to 75 degrees, more conveniently in the range of about 40 to 65 degrees and preferably about 50 degrees. While α(B)~40 degrees is preferred, this is not critical. As with FIGS. 4A-B, light emitting surfaces 43A, 43B, 43C, 43D are inclined with respect to each other and with respect to light exiting surface 47, and each of the emitting surfaces faces light exiting surface 47 enhancing the coupling efficiency to the output. If instead, for example, each emitting surface directly faced another emitting surface, it would take the light emitted along principal direction 49 (or surface normal 43N) additional bounces back and forth to eventually reach the light exiting surface, thereby reducing the coupling efficiency.

FIG. 5A is a plan view and FIG. 5B is a partial cross-sectional side view of LED backlight 22C according to a still further embodiment of the present invention. Heat sink 56 analogous to heat sinks 36, 46 is desirably provided. Backlight 22C comprises LEDs 52 mounted on sloped surfaces 53A, 53B of PCBs 54A, 54B (or equivalent). Surfaces 53A, 53B of PCBs 54A, 54B make angle α(C) with respect to the plane of opening 57 of backlight 22C or angle β(C)=(90−α(C)) degrees with respect to backlight propagation direction 23(C). Assuming that surfaces 53A, 53B have equal inclination, normal 53N to either PCB surfaces 53A, 53B makes angle α(C) with respect to backlight propagation direction 23(C). Stated alternatively, principal light direction 59 of LEDs 52 makes angle α(C) with respect to backlight propagation direction 23C. Angle α(C) is usefully in the range 25 to 65 degrees, more conveniently in the range of about 35 to 55 degrees and preferable about 45 degrees. Accordingly, β(C) is usefully in the range 25 to 65 degrees, more conveniently in the range of about 35 to 55 degrees and preferably about 45 degrees. While α(C)=45 degrees is preferred, this is not critical. The arrangement of FIGS. 5A-B can provide up to $(2)^{1/2}$ times the PCB area as the arrangement of FIGS. 1A-B and correspondingly greater luminescence for the same footprint. The emitting surfaces defined by surfaces 53A, 53B and LEDs 52 in this case face rear surface 55, which is preferably a highly efficient diffusely scattering surface, and which in turn faces light exiting surface opening 57. The efficiency of this backlight configuration may be further enhanced by reducing or eliminating any subsequent diffuser (e.g., 24 in FIG. 2) that would otherwise be placed over opening 57, provided the angles required are within the range −β(C) to +β(C). It is evident from FIGS. 5A-B that this embodiment is particularly beneficial in the case that the area of light exiting surface 57 is smaller than the backlight footprint (W×L). In this case the emitting surface area exceeds both the area of light exiting surface 57 and the backlight footprint (W×L), while maintaining excellent coupling to the light exiting surface. Other surfaces 55' of backlight case 58 are also desirably highly reflective.

FIG. 6A is a plan view and FIG. 6B is a partial cross-sectional side view of LED backlight 22D according to a yet further embodiment of the present invention. Backlight 22D includes LEDs 62, heat sink 66 and case 68 analogous to LEDs 52, heat sink 56 and case 58 of FIGS. 5A-B. Whereas backlight 22C of FIGS. 5A-B has two sloped surfaces 53A, 53B forming a truncated V-shaped structure with the open truncated portion of the "V" oriented toward opening 57 and backlight propagation direction 23C, backlight 22D of FIGS. 6A-6B has four sloped surfaces 63A, 63B, 63C, 63D forming a truncated pyramid structure whose open truncated portion 67 is oriented toward backlight propagation direction 23D, analogous to direction 23C. LEDs 62 are mounted on surfaces 63A-D. Surfaces 63A-D of backlight 22D conveniently make angles α(D), β(D) with respect to the plane of opening 67 and principal light rays 69 (and surface normal 63N), analogous to angles α(C), β(C) with respect to the plane of opening 57 and principal light rays 59 (and surface normal 53N) of backlight 22C. For the same overall backlight footprint (W×L), the pyramidal structure of backlight 22D can provide up to twice the PCB area as the arrangement of FIGS. 1A-B, and other things being equal, can accommodate up to twice as many LEDs and provide correspondingly greater luminance in the same overall footprint. Angle α(D) is usefully in the range 25 to 65 degrees, more conveniently in the range of about 35 to 55 degrees and preferable about 45 degrees. Accordingly, β(D) is usefully in the range 25 to 65 degrees, more conveniently in the range of about 35 to 55 degrees and preferably about 45 degrees. While α(D)~45 degrees is preferred, this is not critical. This embodiment also provides increased emitting surface area, and each of the emitting surfaces faces highly reflective rear surface 65, which in turn faces the light exiting surface, opening 67.

FIG. 7A is a plan view and FIG. 7B is a partial cross-sectional side view of LED backlight 22E according to yet another embodiment of the present invention. Backlight 22E of FIGS. 7A-B is similar to backlight 22D of FIGS. 5A-B except for the additional of further LEDs on backplane 75. Elements 72, 73, 74, 75, 76, 77, 79 of backlight 22E are analogous to corresponding elements 62, 63, 64, 65, 66, 67, 69 of backlight 22D. In backlight 22E, further LEDs 72' are mounted on backplane PCB 75, and heat sink 76' is provided behind backplane PCB 75 to aid in removal of heat from LEDs 72' mounted on PCB backplane 75. It is will be appreciated that significantly more LEDs can be accommodated in the same overall footprint (W×L) of backlight 22E of FIGS. 7A-B than prior art backlight 10 of FIGS. 1A-B, allowing for increased efficiency at a given power level, or increased power capability at a given efficiency due to the improved thermal configuration. This relationship is particularly beneficial at very high luminance levels and elevated ambient temperatures, due to the inherent temperature sensitivity and temperature tolerance of typical light sources such as LEDs. In this configuration, effective coupling is maintained by having the emitting surfaces corresponding to 73A, 73B (along with their respective LEDs 72) facing backplane 75, and backplane 75 (along with its respective LEDs 72') facing light exiting surface 77.

Each of the backlight structures illustrated in FIGS. 3-7 provide a relatively direct path to the light exiting surface, either by having the emitting surface facing the exit or facing a surface which directly faces the exit. Nevertheless, these structures also provide for additional scattering reflections of a portion of the light before it exits backlight 22. This increases the uniformity of illumination, which is a desirable feature. The degree of uniformity mixing of this type is conveniently configurable by the selection of the slant angles of the various surfaces, as well as by light source output profiles and diffuser scattering properties.

Figure 8A:
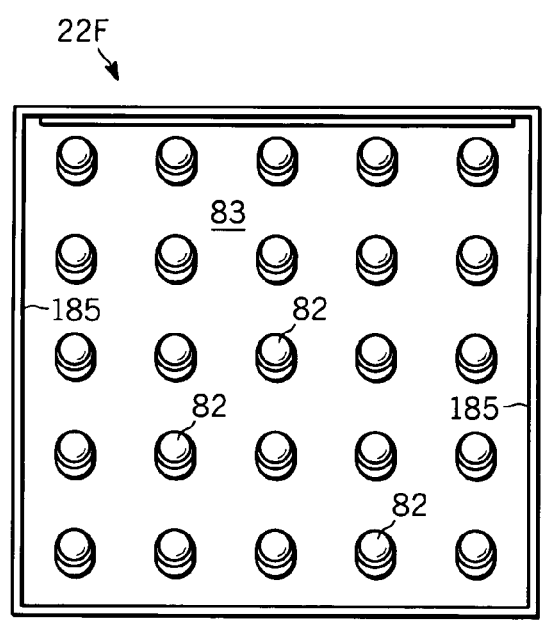
FIG. 8A is a plan view and FIG. 8B is a partial cross-sectional side view of an LED backlight according to a yet further embodiment of the present invention.
Figure 8B:
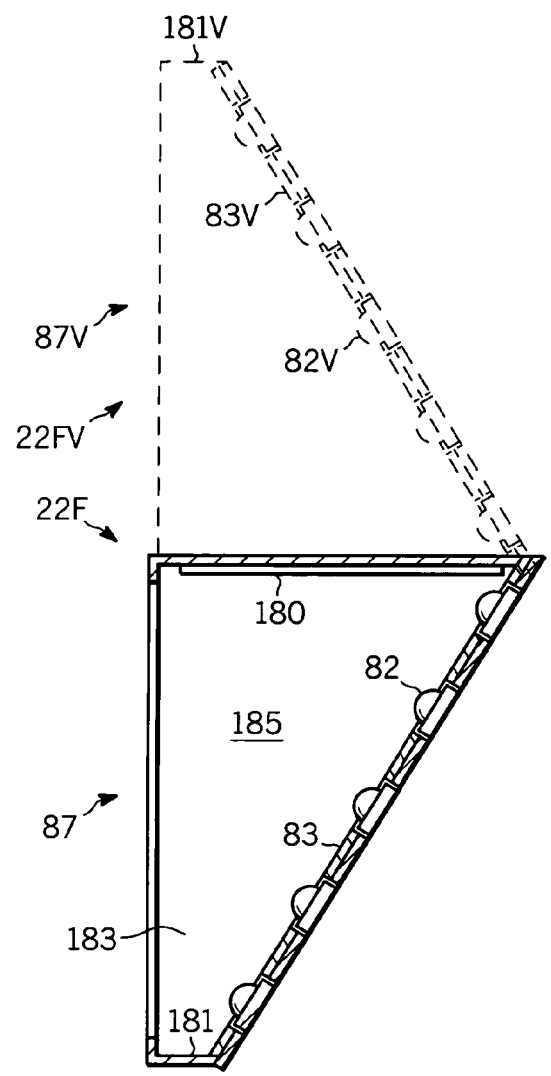

FIGS. 8A-B show a yet further embodiment of the present invention. The backlight 22F of FIGS. 8A-B is similar in many respects to the backlight 22A of FIGS. 3A-B, and hence some of the analogous details are not repeated. In FIGS. 8A-B, reflector 180 has been added to the middle of otherwise hollow cavity 183. Reflector 180 is preferably a specular mirror, although some degree of scatter is acceptable, and reflector 180 is oriented perpendicular to opening 87, the light exiting surface in this embodiment. In the presence of reflector 180, backlight 22F appears to have a symmetric second half, virtual backlight 22FV, where the term virtual in this case refers to an element which is present only in the virtual reflection but is not physically present. It is referenced only to simplify the description in the context of prior embodiments, especially the embodiment of FIGS. 3A-B. Backlight 22F includes surface 83 and associated LEDs 82, which together form an emitting surface for the purpose of this invention. Surface 181 has also been added relative to FIGS. 3A-B to close the hollow cavity with the exception of open light exiting surface 87. Surface 181 and any other surfaces (e.g., surfaces 185) which are required to close the hollow cavity are preferably highly reflective and may be either specular or scattering. In FIG. 8B virtual backlight half 22FV appears to be above mirror 180, along with various virtual backlight components which are reflections of the components of backlight 22F. Virtual surface 83V, along with virtual LEDs 82V, is a virtual emitting surface and is inclined (non-parallel) with respect to surface 83. Virtual opening 87V is a virtual light exiting surface for the virtual backlight half 22FV, and virtual surface 181V is a reflection of surface 181. Backlight 22F has all of the symmetry and advantages of the configuration of FIGS. 3A-B, with the exception that with the addition of reflector 180, the section above centerline 33C in FIGS. 3A-B has been removed and become virtual. This offers significant additional benefits in terms of geometric flexibility and placement, as well as thermal management opportunities as will be described further below. It will be noted that even though only surface 83 has LEDs mounted thereon, the use of mirror 180 creates second light emitting surface 83V. Thus, the arrangement of FIGS. 8A-B (and also FIGS. 9A-B) behaves as if there are at least two light emitting surfaces.

Figures 9A, 9B:
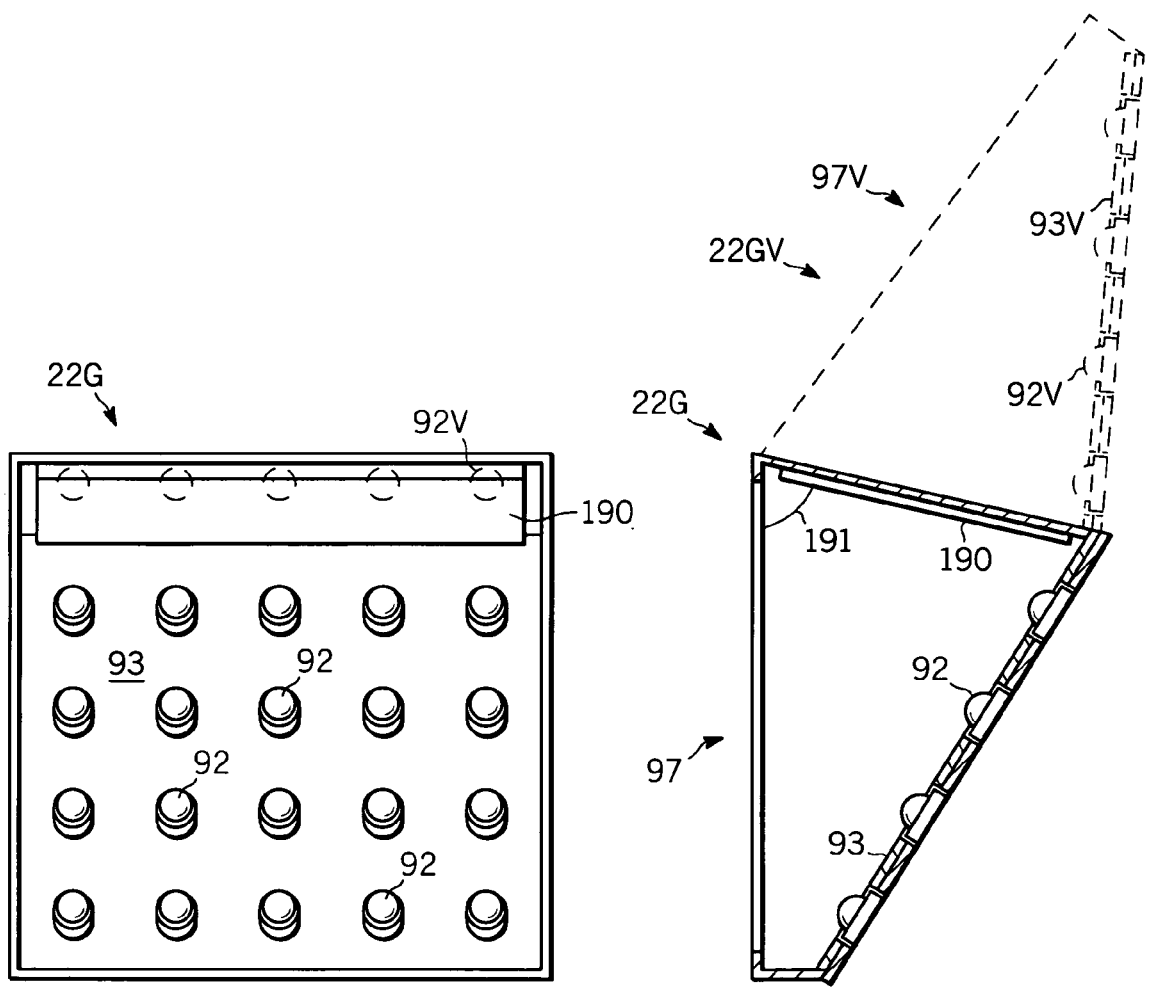
FIG. 9A is a plan view and FIG. 9B is a partial cross-sectional side view of an LED backlight according to an additional embodiment of the present invention.

FIGS. 9A is a plan view and FIG. 9B is a partial cross-sectional side view of an LED backlight according to additional embodiment 22G of the present invention. The embodiment of FIGS. 9A-B is similar to FIGS. 8A-B, with the distinction that reflector 190 in back-light 22G is now tilted with respect to surface normal of opening 97, the light exiting surface. Reflector 190 forms angle 191 with respect to the plane of opening 97, and while shown as an acute angle less than ninety degrees, angle 191 can also be greater than 90 degrees. As can be seen by comparison with FIGS. 8A-B and FIGS. 3A-B, backlight 22G together with its virtual backlight half 22GV again form an effective cavity, but in this case the combined opening of opening 97 and virtual opening 97V do not form a single flat surface. The advantages and description given in connection with FIGS. 8A-B still hold, however, as long as each emitting surface 93 (with LEDs 92), and 93V (with LEDs 92V) face the combined light exiting surface (97 and 97V) in the virtual backlight configuration. As with the previous embodiments, this slanted configuration supports an emitting surface that is larger than light exiting surface 97, which is also the footprint in this case.

Figure 10:
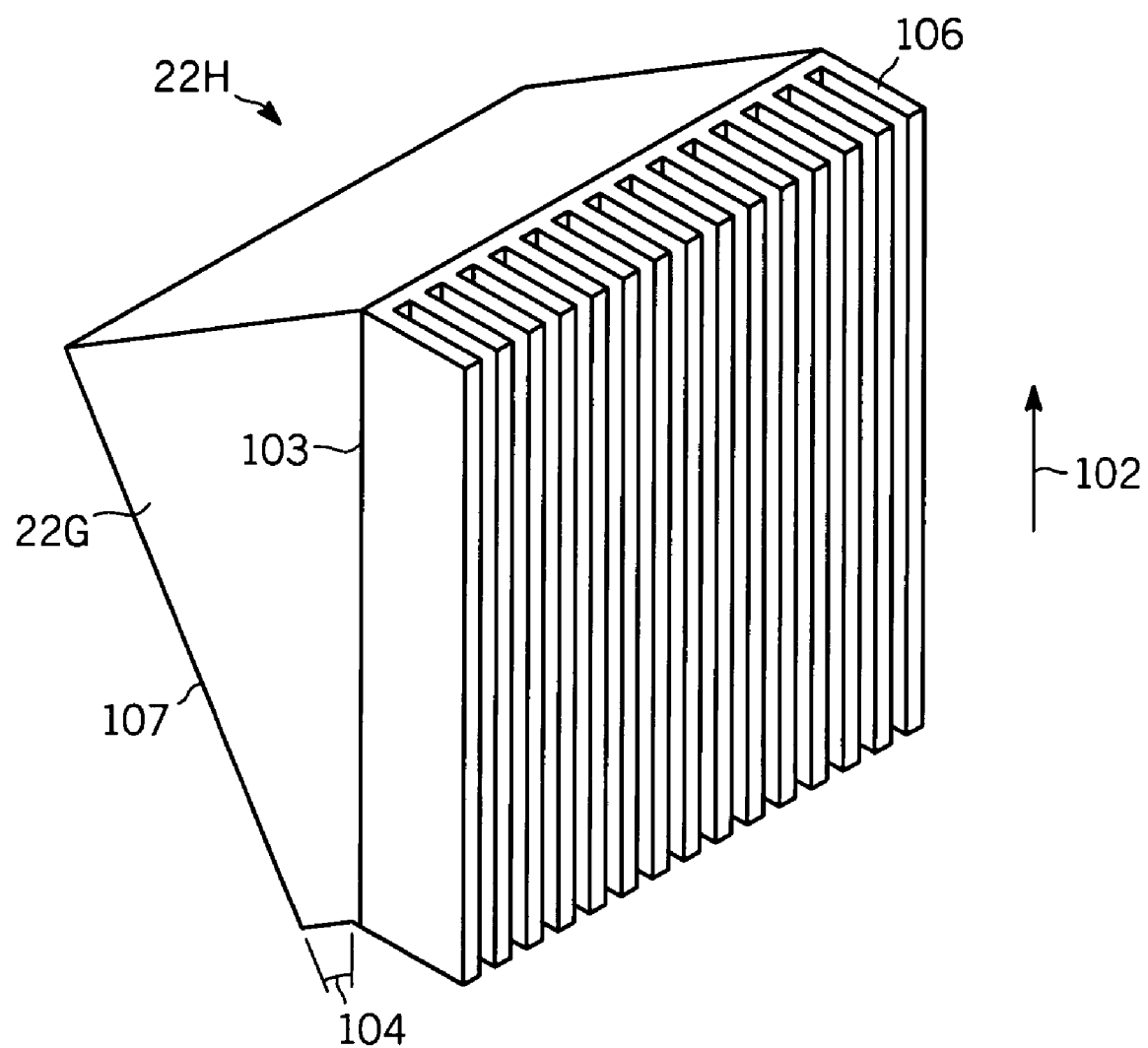
FIG. 10 is a perspective view of an LED backlight according to a further additional embodiment of the present invention.

FIG. 10 is a view of LED backlight 22H according to a further additional embodiment of the present invention. Backlight assembly 22H comprises backlight 22G according to FIGS. 9A-B, heat sink 106 and mounting means (not shown) to align emitting surface 103 and heat sink 106 with vertical axis 102 to maximize convective cooling effectiveness. As was described previously, the system can be conveniently designed to effectively support any of a range of values for angle 104 between light exiting surface 107 and emitting surface 103.

Figure 11:
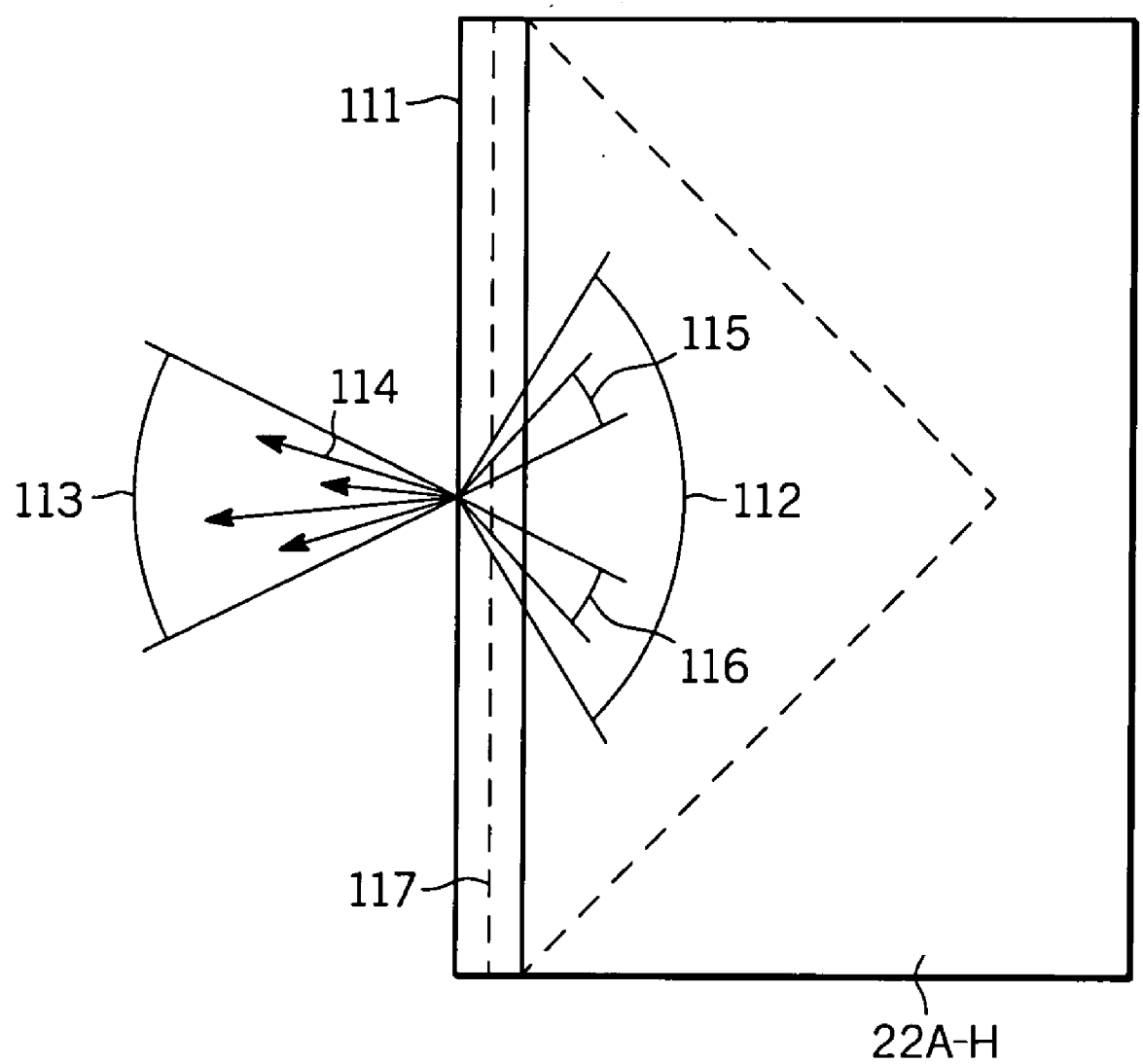
FIG. 11 is a simplified schematic side view of a directional backlight according to another additional embodiment of the present invention.

FIG. 11 is a view of directional backlight 22J according to another additional embodiment of the present invention. The arrangement of backlight 22J combines any of backlights 22A-H with prismatic directionality elements 111. An example of directionality element 111 is Brightness Enhancement Film (BEF) available in several forms from 3M Corporation of St. Paul, Minn. When placed subsequent to the backlight 22A-H, directionality element 111 narrows the range of propagation angles from diffuse (e.g., angular range 112) to narrow (e.g., angular range 113). In practice, however, the majority of the light rays 114 in angular range 113 are incident upon element 111 in angular ranges 115 and 116. As can be seen from observation of each of the foregoing embodiments, ranges 115 and 116 correspond generally to the surface normals of the surfaces facing the light exiting port or surface in several of the described embodiments. Having the surfaces face toward the input angles, ranges 115 and 116, of the directionality element 111 further enhances the efficient coupling aspects of the present invention. Optional diffuser 117, if used, is conveniently placed between directionality element 111 and backlight cavity 22A-H and is preferably a high gain diffuser, for example a textured surface diffuser, although other diffusers can also be used. Any of the previously described backlight embodiments of the present invention may be used for backlight 22A-H.

While at least one exemplary embodiment has been presented in the foregoing detailed description, it should be appreciated that a vast number of variations exist. For example, while particular shapes have been illustrated for heat-sinks 36, 46, 56, 66, 76, 76', 106 these are not intended to be limiting and any shape heat-sink may be used that can dissipate the heat generated by the LEDs installed in the corresponding backlight. Just as the sloped PCB arrangement of the present invention can increase the available PCB area for mounting LEDs, so the sloped arrangement also permits greater heat dissipation area. Thus, more LEDs be accommodated and the heat generated per unit PCB area is the same or less. Further, while the present invention has been described with light emitting diodes (LEDs) as the light sources, persons of skill in the art will understand that any directional or quasi-directional light source can also be used and that the present invention is not limited merely to structures and methods employing LEDs. In addition, while layer 26 has been illustrated as being an LCD layer, any layer or region exhibiting electrically alterable transmission properties can also be used and that the present invention is not limited merely to structures and methods employing LCD layers or regions.

It will also be appreciated that while the backlight and backlight incorporating display of the present invention has been illustrated as using a small number of sloping and preferably but not essentially planar PCB mounting surfaces for the LEDs, that many other configurations are also possible and intended to be included within the scope of the present invention. Non-limiting examples of other useful LED mounting arrangements are: (i) replacing the V-shaped PCB arrangement of FIGS. 3A-B, 5A-B, etc., with a half-cylinder or half-parabola or segmented half-shape with the LEDs mounted on the interior surface thereof and the open plane or surface or truncated portion thereof corresponding to light exit plane or surface 37, 57; (ii) replacing the pyramidal PCB arrangement of FIGS. 4A-B, 6A-B, etc., with a hemisphere or hemi-ellipsoid or other 3-D curved or segmented shape with an open plane or truncated portion, and with the LEDs mounted on the interior surface thereof and the open plane or truncated portion corresponding to light exit plane or surface 47, 67; and (iii) employing analogous curved or segmented surfaces such as discussed in (i) and (ii) above combined with and/or replacing some or all of the PCB surfaces in backlight 22E of FIGS. 7A-B, 8A-B, 9A-B. Persons of skill in the art will understand based on the description herein that many other variations and combinations are possible.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A hollow cavity backlight comprising a plurality of surfaces, said plurality of surfaces comprising:
   an open light exiting front surface;
   a reflective rear surface spaced apart from and facing toward the open light exiting front surface; and
   a plurality of light emitting surfaces disposed between the open light exiting front surface and the reflective rear surface, the plurality of light emitting surfaces comprising a first light emitting surface and a second light emitting surface inclined with respect to the first light emitting surface, each of the first and second light emitting surfaces facing the reflective rear surface and configured to emit light toward the reflective rear surface and away from the open light exiting front surface and wherein the reflective rear surface is configured to redirect the light emitted from the first and second light emitting surfaces toward the open light exiting front surface.

2. The hollow cavity backlight of claim 1 further comprising a heat sink adjacent the first light emitting surface.

3. The hollow cavity backlight of claim 2 further comprising mounting means for maintaining the first light emitting surface in a substantially vertical orientation.

4. The hollow cavity backlight of claim 1 further comprising a prismatic directionality element adjacent to said open light exiting front surface.

5. The hollow cavity backlight of claim 1, wherein the plurality of light emitting surfaces further comprises a third light emitting surface configured to emit light toward the open light exiting front surface and away from the reflective rear surface.

6. The hollow cavity backlight of claim 1, wherein each of the first and second light emitting surfaces are configured to emit light in a direction that is not toward the open light exiting front surface.

7. The hollow cavity backlight of claim 1, wherein the reflective rear surface is at least substantially parallel to the open light exiting front surface.

8. The hollow cavity backlight of claim 1, wherein:
   the first light emitting surface is adjacent to both the open light exiting front surface and the reflective rear surface; and
   the second light emitting surface is adjacent to both the open light exiting front surface and the reflective rear surface.

9. A data display, comprising:
   a variable transmittance layer having first regions adapted to substantially pass light and second regions adapted to substantially block light in response to a signal applied thereto; and
   a hollow cavity backlight coupled to the variable transmittance layer and adapted to provide light in a first direction to the variable transmittance layer, wherein the backlight comprises a plurality of surfaces, the plurality of surfaces comprising:
   an open light exiting front surface;
   a reflective rear surface spaced apart from and facing toward the open light exiting front surface; and
   a plurality of light emitting surfaces disposed between the open light exiting front surface and the reflective rear surface, the plurality of light emitting surfaces comprising a first light emitting surface and a second light emitting surface inclined with respect to the first light emitting surface, each of the first and second light emitting surfaces facing the reflective rear surface and configured to emit light toward the reflective rear surface and away from the open light exiting front surface and wherein the reflective rear surface is configured to redirect the light emitted from the first and second light emitting surfaces toward the open light exiting front surface.

10. The display of claim 9 farther comprising a light dispersive layer between the light emitting surfaces and the variable transmittance layer.

11. The display of claim 9 further comprising a color filter layer coupled to the variable transmittance layer adapted to project a data image at least partly in color.

12. A display for projecting light carrying a data image, comprising:
   a first layer having regions of electrically alterable variable light transmittance for forming the data image; and
   a backlight comprising a plurality of surfaces, the plurality of surfaces comprising:
   an open light exiting front surface coupled to the first layer and configured to provide light to the first layer;
   a reflective rear surface spaced apart from and facing toward the open light exiting front surface; and
   a plurality of light emitting surfaces disposed between the open light exiting front surface and the reflective rear surface, wherein the plurality of light emitting surfaces comprises a first light emitting surface and a second light emitting surface inclined with respect to the first light emitting surface, each of the first and second light emitting surfaces facing the reflective rear surface and configured to emit light toward the reflective rear surface and away from the open light exiting front surface, wherein the reflective rear surface is configured to redirect the light emitted from the first and second light emitting surfaces toward the open light exiting front surface, and wherein an angle α between a principal light ray from the plurality of light emitting surfaces and a normal to the open light exiting front surface has a magnitude greater than zero degrees.

13. The display of claim 12 wherein 15≦α≦65 degrees.

14. The display of claim 13 wherein 25≦α≦50 degrees.

15. The display of claim 14 wherein 35≦α≦45 degrees.

16. A display for projecting light carrying a data image, comprising:
a first layer having regions of electrically alterable variable light transmittance adapted to form the data image; and
a backlight comprising a plurality of surfaces, the plurality of surfaces comprising:
an open light exiting front surface coupled to the first layer and adapted to provide light to the first layer through the open light exiting front surface;
a reflective rear surface spaced apart from and facing toward the open light exiting front surface; and
a plurality of light emitting surfaces disposed between the open light exiting front surface and the reflective rear surface, wherein the plurality of light emitting surfaces comprises a first light emitting surface and a second light emitting surface inclined with respect to the first light emitting surface, each of the first and second light emitting surfaces facing the reflective rear surface and configured to emit light toward the reflective rear surface and away from the open light exiting front surface, wherein the reflective rear surface is configured to redirect the light emitted from the first and second light emitting surfaces toward the open light exiting front surface, and wherein said first and second light emitting surfaces are inclined at an angle α greater than zero with respect to the open light exiting front surface.

17. The display of claim 16 wherein the angle α has a magnitude of at least 15 degrees.

18. The display of claim 17 wherein α has a magnitude of at least 25 degrees.

19. A cavity backlight comprising a plurality of surfaces, said plurality of surfaces comprising:
an open light exiting front surface;
a reflective rear surface disposed at a first angle α with respect to the open light exiting front surface; and
a first light emitting surface facing, and disposed at a second acute angle β with respect to, the reflective rear surface, whereby when light is emitted by the first light emitting surface at least a portion of the emitted light is reflected by the reflective rear surface so as to create the appearance of a virtual second light emitting surface that is inclined with respect to the first light emitting surface, the virtual second light emitting surface being a mirror image of the first light emitting surface and facing the reflective rear surface.

20. The cavity backlight of claim 19, further comprising:
a second reflective surface disposed between the first light emitting surface and the open light exiting front surface.

21. The cavity backlight of claim 19, wherein the first angle α is about ninety degrees.

22. The cavity backlight of claim 19, wherein the reflective rear surface comprises a specular mirror.

23. The cavity backlight of claim 19, wherein the reflective rear surface is at least substantially perpendicular to the open light exiting front surface.

24. The cavity backlight of claim 19, wherein the reflective rear surface is adjacent to each of the open light exiting front surface, the first light emitting surface, and the virtual second light emitting surface.

* * * * *

UNITED STATES PATENT AND TRADEMARK OFFICE
CERTIFICATE OF CORRECTION

PATENT NO. : 7,285,903 B2  Page 1 of 1
APPLICATION NO. : 10/893019
DATED : October 23, 2007
INVENTOR(S) : Brian D. Cull et al.

It is certified that error appears in the above-identified patent and that said Letters Patent is hereby corrected as shown below:

Column 10, line 44, "farther" should be changed to --further--.

Signed and Sealed this

Eighth Day of July, 2008

JON W. DUDAS
*Director of the United States Patent and Trademark Office*